United States Patent

Bennett et al.

[15] 3,662,617
[45] May 16, 1972

[54] REMOTE CONTROL ASSEMBLY

[72] Inventors: William G. Bennett, Troy; Donald M. Miller, Pontiac, both of Mich.

[73] Assignee: Teleflex, Inc., North Wales, Pa.

[22] Filed: Oct. 8, 1970

[21] Appl. No.: 79,195

[52] U.S. Cl............................74/501 R, 285/302, 287/58 CT
[51] Int. Cl. ..........................................F16c 1/14, F16c 1/22
[58] Field of Search ......................74/501, 501 P, 502, 478; 285/302, 303, 298; 287/58, 58 CT; 64/14; 73/321, 318; 236/51

[56] References Cited

UNITED STATES PATENTS

| | | | |
|---|---|---|---|
| 3,572,159 | 3/1971 | Tschanz | 74/501 |
| 1,833,040 | 11/1931 | Rader | 285/302 |
| 2,847,872 | 8/1958 | Todd | 74/478 |

*Primary Examiner*—William E. Wayner
*Attorney*—McGlynn, Reising, Milton & Ethington

[57] ABSTRACT

A motion transmitting remote control assembly including a conduit and a motion transmitting core element movably supported by the conduit with the ends thereof extending from the ends of the conduit. Adjustment means is disposed adjacent a first end of the conduit for automatically allowing the conduit to move longitudinally relative thereto in response to a predetermined force being applied thereto. More specifically, the first end of the conduit has a fitting attached thereto with ratchet teeth thereon which coact with ratchet teeth in a support member adapted for attachment to support structure whereby the effective length of the conduit may be adjusted by applying a predetermined force to the core element to in turn adjust the distance the core element extends from the conduit.

2 Claims, 4 Drawing Figures

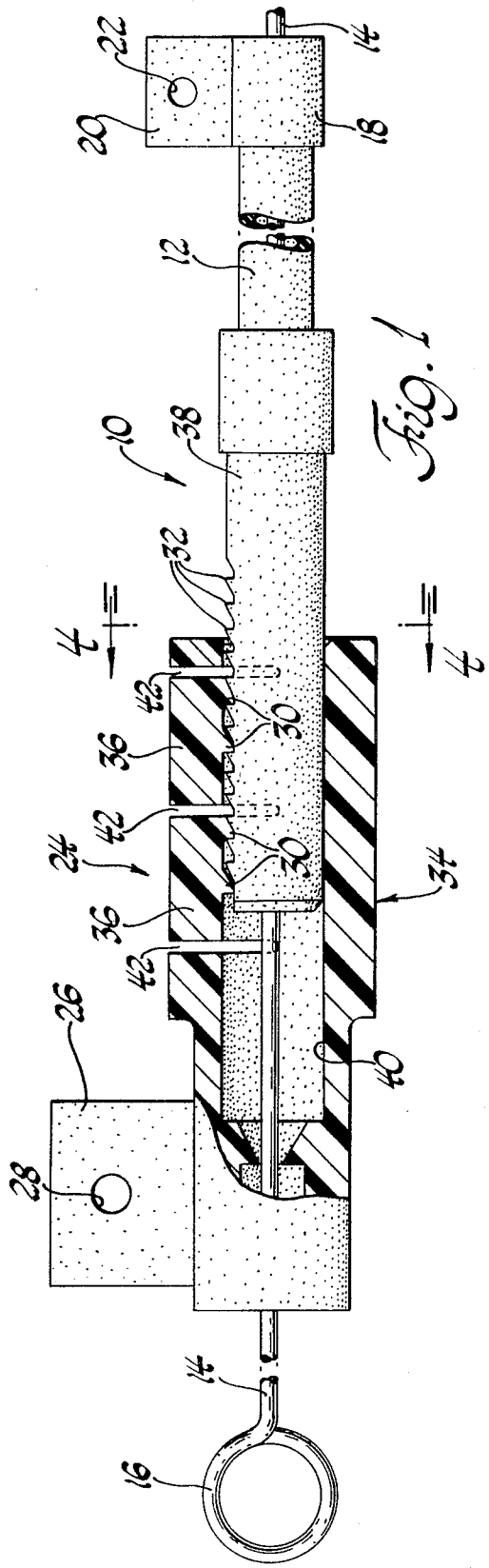
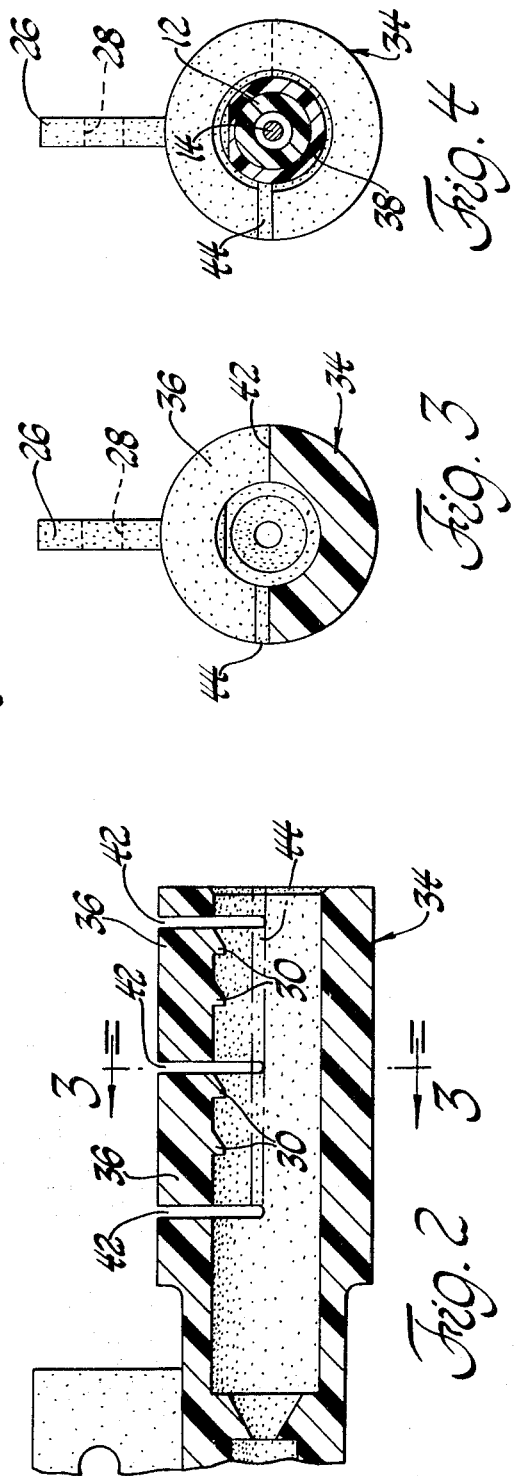

REMOTE CONTROL ASSEMBLY

The instant invention relates to a motion transmitting remote control assembly of the type wherein motion is transmitted in a curved path by a flexible motion transmitting core element movably supported by a flexible conduit.

Such remote control assemblies normally include means adjacent each end of the conduit for attaching the conduit to support structure with the core element extending from each end of the conduit. It is frequently desirable to adjust the length of the conduit to change the position of one end of the core element extending from the conduit once the assembly is installed. An example of such a situation is wherein a remote control assembly is utilized to interconnect the accelerator pedal and a carburetor operating lever arm in an automobile. In this situation, the assembly is usually installed by attaching the conduit to the body of the automobile adjacent the accelerator pedal while attaching the end of the core element extending therefrom to the accelerator pedal. The opposite end of the conduit is attached to a support structure adjacent the carburetor so that the other or opposite end of the core element may be attached to the operating lever of the carburetor. Frequently, however, the end of the core element adjacent the carburetor does not extend from the conduit a proper amount. During such installation the accelerator pedal is in its unmoved or idle position as is the operating lever of the carburetor and if the end of the core element adjacent to the operating lever of the carburetor is not positioned correctly, the operating lever of the carburetor must be moved for attachment to the core element so that the end result is that the accelerator pedal is in the idle position but the operating lever of the carburetor is not. The position of the end of the core element extending from the conduit, i.e., the distance the core element extends from the conduit, may be changed by altering the length of the path over which the conduit extends. Assemblies for accomplishing such an adjustment are shown in U.S. Pat. Nos. 3,289,491 and 3,393,578 both of which are assigned to the Assignee of the instant invention. The assembly shown in these patents employ rotating threaded members which must be manually rotated to gradually change the length of the conduit. Such assemblies are excellent for small adjustments which require little time but are not satisfactory in situations where the adjustment may be significant and must be made rapidly. Another remote control assembly for accomplishing such an adjustment is shown in copending application Ser. No. 832,760, filed June 12, 1969 in the name of August E. Tschanz, now U.S. Pat. No. 3,572,159 assigned to the assignee of the instant invention. This latter assembly solves the problem by disposing a threaded fitting on one end of the conduit which extends through a support member adapted for attachment to support structure with a locking member movably supported by the support member for movement between locked and unlocked positions. The locking member must be manually moved between the unlocked position and the locked position. Thus, when this control assembly is installed, as for example in the accelerator environment, the accelerator must be moved to an extreme position by one individual and a second individual is necessary to push the locking member to the locked position to adjust the overall effective length of the conduit.

Accordingly, it is an object and feature of this invention to provide such a motion transmitting remote control assembly which includes adjustment means for automatically allowing the conduit to move longitudinally relative thereto in response to a predetermined force applied thereto by the core element so as to automatically adjust the distance the core element extends from the conduit so as to allow the adjustment to be made by one individual at one end of the remote control assembly.

In correlation with the foregoing object and feature, it is another object and feature of this invention to provide such a remote control assembly wherein the adjustment means includes a support member adapted to be attached to support structure with locking means movably supported by the support port member and including ratchet teeth for coacting with ratchet teeth on a fitting on the conduit whereby the fitting and the conduit may be moved relative to the support member in one direction by applying a predetermined force thereto.

Other objects and attendant advantages of the present invention will be readily appreciated as the same becomes better understood by reference to the following detailed description when considered in connection with the accompanying drawings wherein:

FIG. 1 is a fragmentary elevational view partially in cross section of a preferred embodiment of the instant invention;

FIG. 2 is a fragmentary cross sectional view of a support member utilized in the preferred embodiment of the instant invention;

FIG. 3 is a cross sectional view taken substantially along line 3—3 of FIG. 2; and FIG. 4 is a cross sectional view taken along line 4—4 of FIG. 1.

Referring now to the drawings, a motion transmitting remote control assembly constructed in accordance with the instant invention is generally shown at 10.

The remote control assembly 10 includes a conduit 12 which has an outer surface of organic polymeric material such as polyethylene or the like. Preferably the conduit is of the well-known type utilized in such remote control assemblies including an inner tubular member of an organic polymeric or plastics material surrounded by a plurality of filaments or metal wires disposed on a long lead and encased in an outer jacket or organic polymeric material such as polyethylene or an equivalent plastic material.

The assembly 10 also includes a metal wire-like motion transmitting core element 14 movably supported by the conduit 12. The ends of the core element 14 extend from the ends of the conduit 12. Both ends of the core element 14 may be adapted for attachment to control members as by the loops 16. In many embodiments, one end of the core element will be attached to a member to be controlled whereas the other end of the core element will be attached to a manually actuable control knob or the like. A fitting 18 preferably or organic polymeric material is disposed about or adjacent a first end of the conduit 12 for attaching the conduit to support structure, such as the body of an automobile. The fitting 18 has a flange 20 extending therefrom with a hole 22 therein through which an appropriate fastening means may be disposed.

An adjustment means generally shown at 24 in FIG. 1 is disposed adjacent the second end of the conduit 12 for automatically allowing the conduit 12 to move longitudinally relative thereto in response to a predetermined force applied thereto. The adjustment means 24 is adapted by the flange 26 and the hole 28 for attachment to support structure for supporting the conduit 12 whereby the fitting 18 and the adjustment means 24 may be attached to support structure and the core element 14 connected at least at one end to a member and the predetermined force applied to the conduit through the core element 14 to automatically move the conduit 12 relative to the adjustment means 24 to adjust the distance the core element 14 extends from the conduit 12.

The adjustment means includes a plurality of coacting irregularities comprising the ratchet teeth 30 and 32 which are biased into locking engagement with each other for normally preventing relative movement between the attachment means 24 and the conduit 12 but are movable relative to each other in response to the predetermined force applied to the conduit through the core element for allowing relative movement between the adjustment means 24 and the conduit 12. The teeth 30 and 32 are ratcheting teeth in that the teeth 30 slant downwardly toward an upwardly directed wall which is generally perpendicular to the axis of the conduit 12 or the core element 14. In a similar manner the teeth 32 slant upwardly to a wall which is also generally perpendicular to the axis of the conduit 12 and the core element 14. Thus, as will become more clear hereinafter, the ratcheting teeth 30 and 32 allow relative movement between the adjustment means 24 and the conduit 12 in one direction but prevent such relative movement in the opposite direction.

The adjustment means 24 includes a support member which is generally indicated at 34. The support member 34 is adapted by the flange 26 and the hole 28 to be attached to a support structure, such as the body of an automobile. Locking means comprising the locking fingers 36 are movably supported by the support member 34. The ratcheting teeth 30 extend from the locking fingers 36 whereas the ratcheting teeth 32 are disposed on the conduit 12. More specifically, another fitting 38 is disposed about and secured to the conduit 12 adjacent the second end thereof and the ratchet teeth 32 are disposed in the fitting 38.

The fitting 38 is generally circular in cross section but includes a flat section along which the ratchet teeth 32 are disposed. The support member 34 has a bore 40 extending thereinto in which the fitting 38 is movably disposed.

The locking fingers 36 are integral with the support member 34 and are defined by the slots 42 which extend circumferentially thereabout. The slots 42 are joined by a longitudinally extending slot 44 on one side of the support member 34 so that the locking fingers 36 position the ratcheting teeth 30 in the bore 40 but are flexible so that they may move radially outwardly as the teeth 30 ratchet along the teeth 32.

Like the fitting 18, the fitting 38 as well as the support member 34 are made of organic polymeric material. It will be understood that the conduit may be clamped to support structure instead of using the fitting 18.

In operation the remote control assembly may be installed by attaching the flange 20 of the fitting 18 and the flange 26 of the support member 34 to support structure and attaching the loop 16 of the core element 14 to a member to be controlled. The fitting 38 is disposed within the bore 40 of the support member 34 only a slight distance so that the conduit 12 extends over a curved path between its ends which is too long. In this situation the length of the conduit is adjusted by pulling the core element 14 from the right as viewed in FIG. 1 until the member to which the loop 16 is attached has moved to its maximum or extreme position to the right, i.e., has bottomed out. Once bottomed out, the loop 16 can move no farther to the right and a continued force applied to the core element 14 will place a force upon the conduit tending to decrease its length by removing any curves or bows in its path. In other words, such a tension force on the core will tend to straighten out the conduit. When this force reaches a predetermined level the conduit will shorten as the fitting 38 moves or ratchets into the support member 34; thus, automatically adjusting the length of the conduit.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly comprising; a flexible conduit, a flexible motion transmitting core element movably supported by said conduit with the ends thereof extending from the ends of said conduit, adjustment means operatively connected to said conduit for automatically allowing said conduit to move longitudinally relative thereto in response to a predetermined force applied thereto, said adjustment means operatively connected to said conduit for automatically allowing said conduit to move longitudinally relative thereto in response to a predetermined force applied thereto, said adjustment means including means for attaching said adjustment means to support structure for supporting said conduit whereby said conduit and said adjustment means may be attached to support structure and said core element connected at least at one end to a member and said predetermined force applied to said conduit through said core element to automatically move said conduit relative to said adjustment means to adjust the distance said core element extends from said conduit.

2. An assembly as set forth in claim 1 wherein said adjustment means includes a support member adapted for attachment to a support structure, locking means movably supported by said support member, and a plurality of coacting irregularities disposed on said locking means and said conduit respectively, said irregularities biased into locking engagement with each other for normally preventing said relative movement and movable relative to each other in response to said predetermined force for allowing said relative movement, said irregularities comprising ratcheting teeth for allowing said relative movement in one direction while preventing said relative movement in the opposite direction.

* * * * *